United States Patent
Akedo et al.

[11] Patent Number: 5,975,144
[45] Date of Patent: Nov. 2, 1999

[54] FLEXIBLE HOSE MADE OF NONWOVEN FABRIC

[75] Inventors: Youichi Akedo; Seiji Shiga; Tetsuya Inagake; Shoji Hattori; Yoshiki Yoshitomi, all of Kakegawa, Japan

[73] Assignee: Tigers Polymer Corporation, Toyonaka, Japan

[21] Appl. No.: 08/931,886

[22] Filed: Sep. 17, 1997

[30] Foreign Application Priority Data

Feb. 17, 1997 [JP] Japan ..................... 9-049727

[51] Int. Cl.⁶ ..................... F16L 11/08
[52] U.S. Cl. ..................... 138/129; 138/122; 138/154; 138/144; 138/172
[58] Field of Search ..................... 138/129, 137, 138/140, 144, 153, 150, 154, 172, 130, 121, 122, 141

[56] References Cited

U.S. PATENT DOCUMENTS

| | | | |
|---|---|---|---|
| 3,817,288 | 6/1974 | Ball | 138/125 |
| 4,196,755 | 4/1980 | Kutnyak et al. | 138/129 X |
| 4,304,266 | 12/1981 | Kutnyak et al. | 138/129 |
| 4,490,575 | 12/1984 | Kutnyak et al. | 138/129 X |
| 4,838,317 | 6/1989 | Andre et al. | 138/129 X |
| 4,964,440 | 10/1990 | Andre et al. | 138/129 X |
| 5,127,442 | 7/1992 | Blomqvist | 138/129 X |

*Primary Examiner*—Patrick Brinson
*Attorney, Agent, or Firm*—Burns, Doane, Swecker & Mathis, LLP

[57] ABSTRACT

A flexible hose which is formed by attaching a resin reinforcing coil member to a cylindrical body, the cylindrical body being composed of a nonwoven fabric layer which is formed by winding a nonwoven fabric tape spirally and connecting adjacent side end portions and an air-cut layer which forms on at least one side of the nonwoven layer. The nonwoven fabric tape and the reinforcing coil member are formed of heat-fusible resin materials, and the reinforcing coil member is fused with the nonwoven fabric layer in a body.

6 Claims, 3 Drawing Sheets

FLEXIBLE HOSE MADE OF NONWOVEN FABRIC

BACKGROUND OF THE INVENTION

1. Field of the Invention

The present invention relates to a flexible hose, and more particularly to a flexible hose which has high flexibility and expandability, the flexible hose being light weight and easy to handle and being able to form in long length. This flexible hose is suitable for air-conditioning duct.

2. Description of Related Art

Conventionally, a hose which is formed by winding a tape made of soft vinyl chroride spirally and connecting side end portions of the tape to form a cylindrical body and applying a reinforcing coil member made of hard vinyl chroride on the cylindrical body is often used as an air-conditioning duct hose, since this type of duct hose has high formability and requires low manufacturing cost. However, reducing a thickness of the cylindrical body is technically limited, and further, it is difficult to keep the hose compact when not in use, furthermore, it is difficult to handle because the weight of the duct hose is considerably heavy. Also, the use of vinyl chroride tends to be limited in recent global environment problem, because a combustion waste of vinyl chroride generates a noxious gas and is considered to be a cause of acid rain, and vinyl chroride itself is considered to be a cancerating substance.

On the other hand, Japanese Patent Publication No. 6-21326 mentions that a hose made of a synthetic fiber filament is used as a duct hose. However, although this hose has an advantage of light weight of a nonwoven fabric, since this hose is made by winding and connecting the nonvoven fabric into a cylindrical form, a long-length hose can not be produced, and further, a cylindrical body can not be kept stable because there is no reinforcing member for keeping the shape of the hose.

SUMMARY OF THE INVENTION

An object of the present invention is to provide a flexible hose which keeps an advantage of forming a cylindrical body mainly of nonwoven fabric and eliminates inconvenience caused by the above, and further has performances such as light weightiness, flexibility, expandability, heat resistance, heat insulation and formability.

In order to attain the object, a flexible hose according to the present invention is a flexible hose which has a cylindrical body composed of a nonwoven fabric layer which is formed by winding a nonwoven fabric tape spirally and connecting adjoining ends of the tape and an air-cut layer which is layered on at least one side of the nonwoven layer, the cylindrical body being supported by a resin reinforcing coil member, the nonwoven fablic tape and the reinforcing coil member being made of resin materials which are heat-fusible with each other and the reinforcing coil member being fused with the nonwoven layer in a body.

In the flexible hose according to the present invention, the nonwoven fablic layer which forms a main portion of the cylindorical body is formed by winding the nonwoven fabric tape spirally. Thus, the nonwoven fabric layer is flexible and bendable. Also, since the resin reinforcing coil member for keeping the cylindrical shape is wound spirally and attached to the nonwoven fabric layer, high flexibility and form-keeping ability can be kept, and further, by contracting the flexible hose in an axis direction of the cylindrical body, the flexible hose can be transported or kept easily. Furthermore, the flexible hose can be cut in a desired length easily.

Also, since a main portion of the cylindrical body is formed of the nonwoven fabric and reinorced by the reinforcing coil member, the weight of the flexible hose can be largely reduced compared with a hose of which cylindrical body is formed by general resin such as chroride resin and a hose using a metal coil as a reinforcing coil member.

Furthermore, with heat-fusing the reinforcing coil member with the nonwoven fabric layer which forms the cylindrical body, a trouble for connecting the coil with a hose surface such as applying adhesive agent and covering with resin can be eliminated.

Further, in the flexible hose according to the present invention, with connecting adjacent side end portions of the nonwoven fabric tape in a body through the reinforcing coil member which is heat-fused across adjacent side end portions of the tape, connecting nonwoven fabric tape can be carried out easily without troubles such as applying adhesive agent at side end portions.

Furthermore, in the flexible hose according to the present invention, with forming an external layer of the cylindrical body of the nonwoven fabric layer and forming the air-cut layer which forms an internal layer of a resin film, dew drops formed on the surface of the hose is absorbed and dispersed by the nonwoven fabric layer in capilary phenomenon, thus, a dew condensation phenomenon can be prevented. Therefore, this flexible hose can be used for the purpose which requires heat insulation. Also, with forming the air-cut layer of a resin film which can be heat-fused with the nonwoven fabric tape, it becomes easy to layer the cylindrical body quite thin. Therefore, it is preferable to decrease the weight of the hose. However, the present invention does not limit the material for forming the air-cut layer to the resin film which can be heat-fused with the nonwoven fabric tape. There is no problem to use a well-known material such as a thin metal plate of aluminum.

As for the material of the reinforcing coil member, it is not specifically limited as long as it is a resin material which can be heat-fused to the nonwoven fabric layer and has high rigidity, however, hard polypropylene is preferably selected because of its light weight. In this case, it is prefarable to form the nonwoven fabric layer using the nonwoven fabric tape made of polypropylene fiber and an air-cut layer using a polypropylene film made of polypropylene fiber. When all structural elements are made of polypropylene, since a heat deformation temperature (approximately 104 degrees Centigrade) and a fusing point (approximately 170 degrees Centigrade) of polypropylene are high, the hose can be used under high temperature. Thereby, the heat resistance ability of the hose is improved. Also, the weight of the hose is further decreased, and polypropylene is well burnt with few ashes and no toxic gas is generated. Thus, waste disposal is quite easy.

Also, when a hose which is formed in a long length is cut into a desired length, the resin reinforcing coil member used in the present invention can be cut easily compared with a conventional metal coil, and does not gather rust.

The cylindrical body can be formed by winding a composite tape which is made by adhering the nonwoven fabric tape and the resin film in a body in advance by laminating and so on and connecting side end portions of the composite tape. A preferable example is a composite tape which is made by laminating a polypropylene nonwoven fabric and a polypropylene resin film.

Also, it is possible that the nonwoven fabric tape and a tape material which forms the air-cut layer are separately wound spirally, and then layered by adhering each facing surface with an adhesive agent. In this case, it is possible that each tape such as the nonwoven fabric tape and the resin film are wound spirally and layered in a non-adhered condition, and at the same time, a resin reinforcing coil member which is wound spirally across adjacent side end portions of respective tapes is fused in a body with the nonwoven fabric tape and the resin tape only at a width of length direction of the nonwoven fabric layer which is contacted directly by heat of the reinforcing coil member.

Further, in the felxible hose according to the present invention, a sub reinforcing coil member can be provided between coils of the reinforcing member. With providing such a sub reinforcing coil member, the formability of the flexible hose is kept more preferably. Especially, when the width of the nonwoven fabric tape is large, it is more efficient to provide the sub reinforcing coil member. Also, enlarging the width of the nonwoven fabric tape is prefarable in improving a forming speed of the duct hose.

BRIEF DESCRIPTION OF THE DRAWINGS

This and other objects and features of the present invention will become apparent from the following description with reference to the accompanying drawings, in which.

DETAILED DESCRIPTION OF THE PREFERRED EMBODIMENT

The description of preferred embodiments according to the present invention is given below, referring to the accompanying drawings. The following embodiments are duct hoses used as air-conditioning ducts. However, flexible hoses according to the present invention are for various uses.

Figure 1:
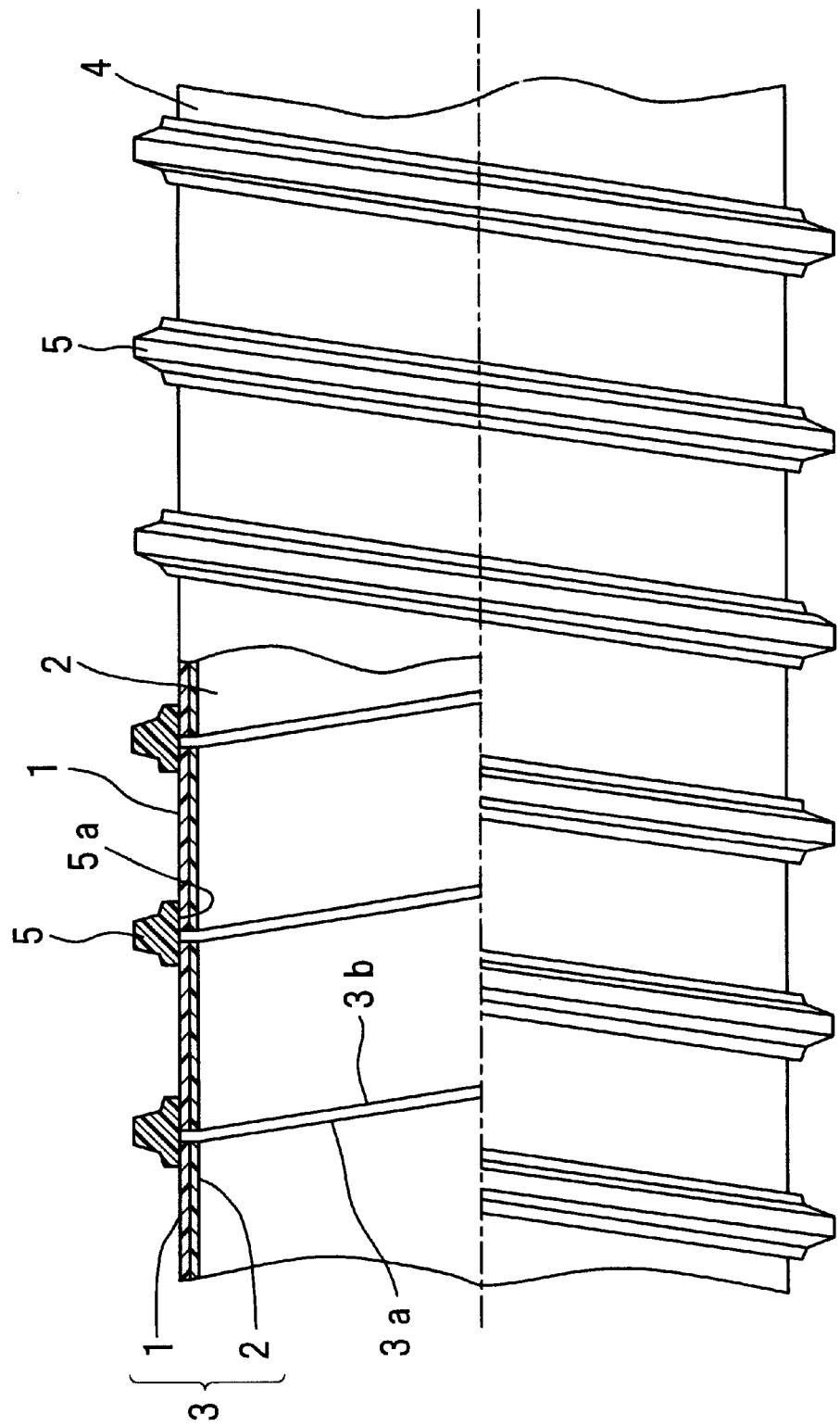
FIG. 1 is an elevational view which shows a duct hose which is a first embodiment of the present invention wherein a part of the duct hose is cut.

FIG. 1 shows a duct hose which is a first embodiment of the present invention. The duct hose is formed in following procedures. First, a composite tape 3 is made by laminating a polypropylene film 2 which is an air-cut layer on one side of a nonwoven fabric tape 1 made of polypropylene fiber which is a nonwoven fabric layer. Then, a cylindrical body 4 is formed by winding the composite tape 3. The duct hose is made by winding a hard polypropylene resin coil 5 which is a reinforcing coil member on an outside of the cylindrical body 4 and fusing the hard polypropylene resin coil 5 with the cylindrical body 4 by heat in a body.

The duct hose is formed by simultaneously winding the composite tape 3 which is laminated in advance and the resin coil 5 which is just extrude-molded on hose forming shafts (not shown). The composite tape 3 is wound in such a manner that adjacent side end portions 3a and 3b nearly contact to each other, and the heat-melted resin coil 5 which has a slightly wide bottom surface 5a is attached on circumferential surface of the nonwoven tape 1 in such a manner that the resin coil 5 extends over the side end portions 3a and 3b. The side end portions 3a and 3b of the composite tape 3 are not connected with each other directly, but connected in a body by being heat-fused with the resin coil 5 respectively.

Figure 2:
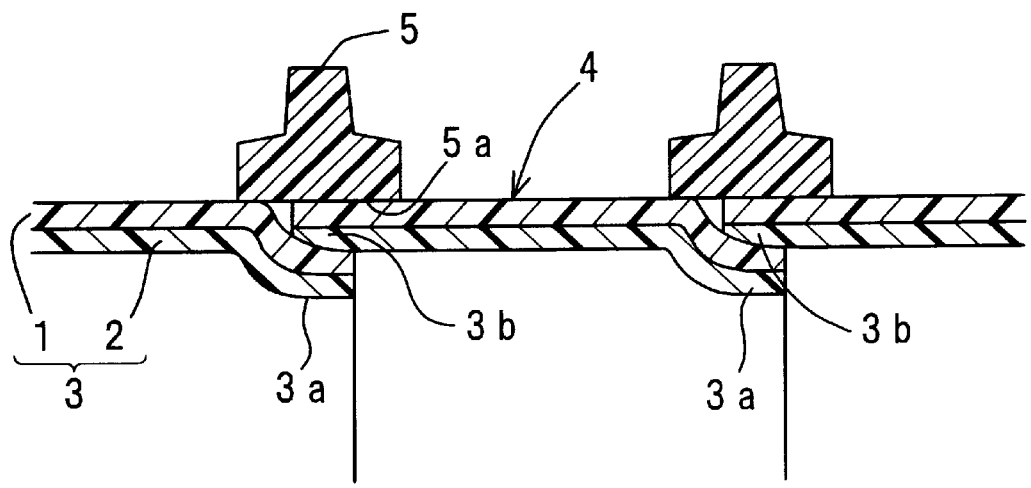
FIG. 2 is a sectional view of an important part of the duct hose which is a second embodiment.

FIG. 2 is an enlarged sectional view which shows an important portion of a duct hose which is a second embodiment of the present invention. The composite tape 3 which is formed by laminating a polypropylene film on one side of the nonwoven tape 1 made of polypropylene fiber is wound spirally in order to form the cylindrical body 4 in such a manner that adjacent side end portions 3a and 3b of the composite tape 3 are overlapped, and at the same time, heat-melted resin coil 5 is heat-fused on the circumferential surface at the portion wherein the composite tape 3 is overlapped.

Figure 3:
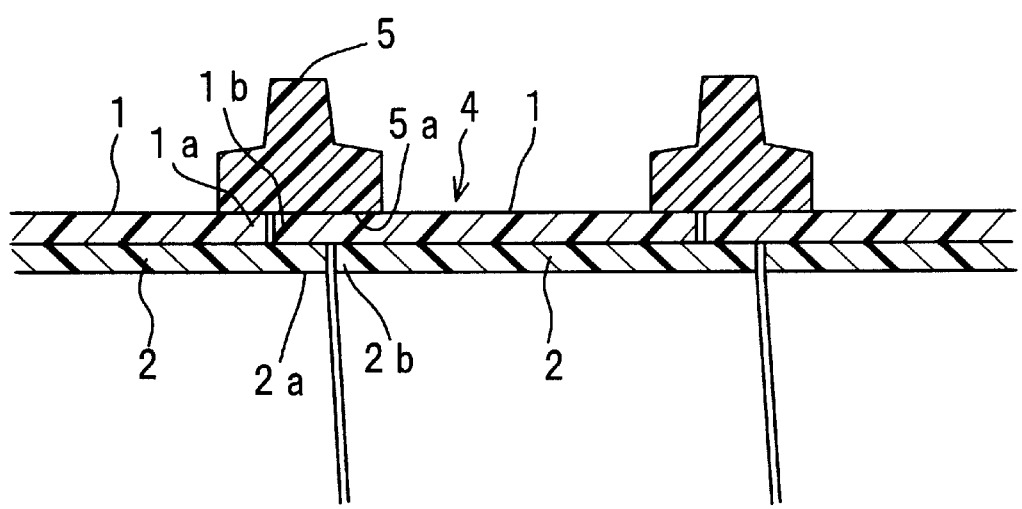
FIG. 3 is a sectional view of an important part of the duct hose which is a third embodiment.

FIG. 3 is an enlarged sectional view of the important portion of a duct hose which is a third embodiment of the present invention. The tape 2 such as a resin film is wound spirally in such a manner that side end portions 2a and 2b are nearly connected to form an air-cut layer which is an inner layer of the cylindrical body 4. And at the same time, the nonwoven fabric tape 1 is wound spirally on the circumferential surface of the tape 2 in such a manner that adjacent side end portions 1a and 1b are nearly connected to each other to form an nonwoven fabric layer. Connecting portions of adjacent side end portions of the air-cut layer and the nonwoven fabric layer are in different positions in the axis direction of the cylindrical body 4, and the resin coil 5 is heat-fused on the circumferential surface at the connecting portions of the side end portions 1a and 1b of the nonwoven fabric tape.

Figure 4:
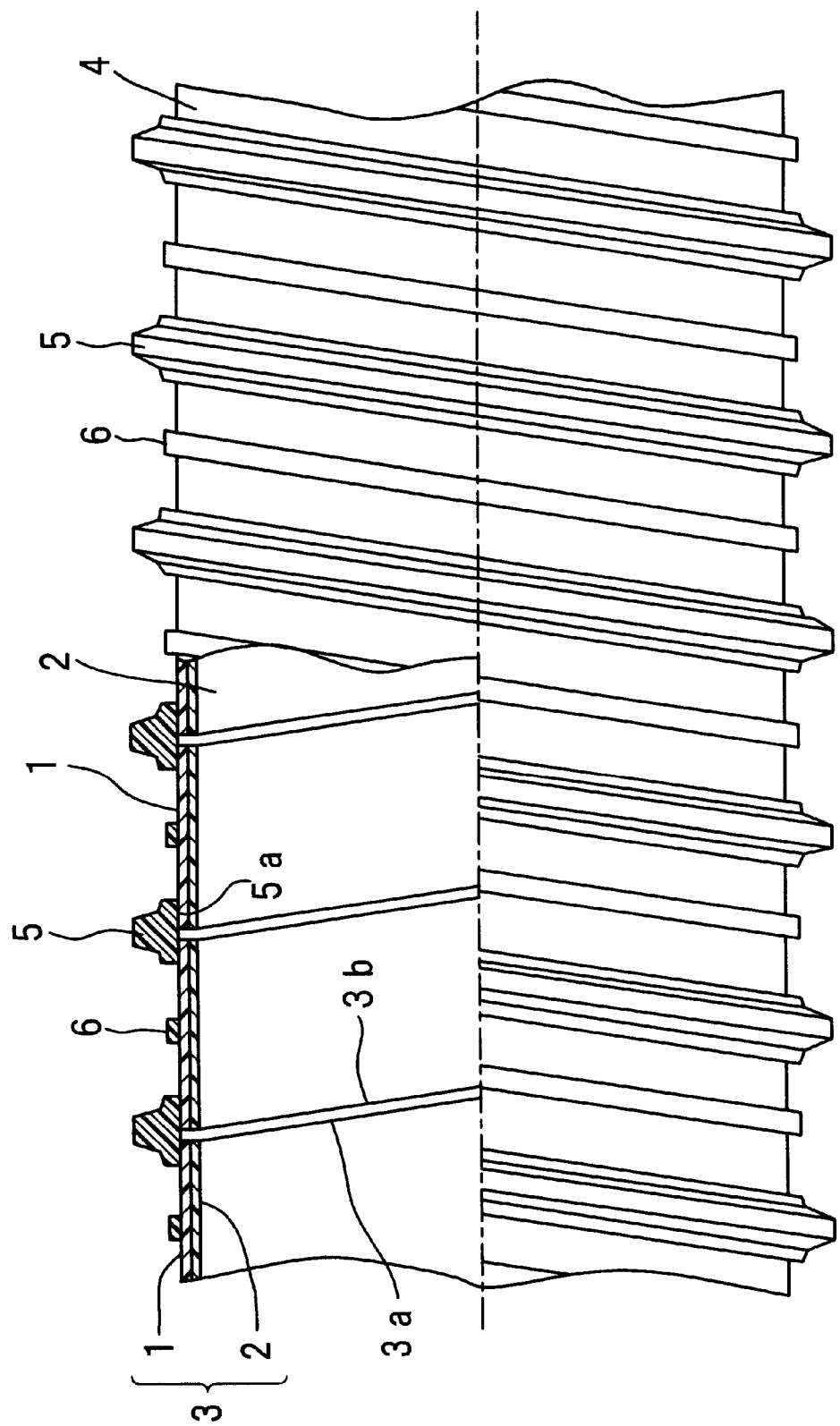
FIG. 4 is an elevational view which shows a duct hose which is a fourth embodiment of the present invention wherein a part of the duct hose is cut.

FIG. 4 shows a duct hose which is a fourth embodiment of the present invention. In this duct hose, another resin coil 6 is wound between the resin coil 5 on the circumferential surface of the cylindrical body 4 of the duct hose which is the first embodiment of the present invention. The resin coil 5 functions as a main reinforcing coil member. The resin coil 6 is relatively small in a cross-sectional area, and functions as a subsidiary reinforcing coil member. With providing the resin coil 6, the formability of the cylindrical is improved.

Followings are various embodiments of the duct hose according to the present invention besides the embodiment described in FIGS. 1 through 4.

(1) A duct hose wherein an internal layer and an external layer are formed separately by winding and overlapping adjacent side end portions of a nonwoven fabric tape and a resin film individually, respective side end portions being connected directly in a body.

(2) A duct hose wherein a nonwoven fabric layer is formed as an internal layer of a cylindrical body, and a resin coil is connected with the nonwoven fabric layer.

(3) A duct hose wherein an air-cut layer which is formed on one side of a nonwoven fabric layer is formed by winding a nonwoven fabric tape and a tape which is non-adhesive to the nonwoven fabric tape simultaneously, and both layers are connected in a body to form a cylindrical body.

(4) A duct hose wherein an air-cut layer which is formed on one side of a nonwoven layer is layered after the nonwoven layer is formed.

(5) A duct hose wherein a nonwoven fabric tape and a resin coil are formed of resin materials which can be mutually heat-fused except polypropylene.

(6) A duct hose wherein a sectional shape of a reinforcing coil member is optional such as round, rectangular and triangle.

Although the present invention has been described in connection with the preferred embodiments above, it is to be noted that various changes and modifications are apparent to a person skilled in the art. Such changes and modifications are to be understood as being within the scope of the present invention.

What is claimed is:

1. A flexible hose comprising:

a cylindrical body which is composed of a nonwoven fabric layer and an air-cut layer, the nonwoven fabric layer being formed by winding a nonwoven tape spirally, the air-cut layer being layered on at least one side of the nonwoven fabric layer; and a resin reinforcing coil member which is attached to the cylindrical body;

wherein the nonwoven fabric tape and the reinforcing coil member are formed of heat-fusible resin materials and adjacent side end portions of the nonwoven tape are connected to the reinforcing coil member and are fused thereto by heat to form one body without the adjacent side end portions overlapping.

2. A flexible hose as claimed in claim 1, wherein an external layer of the cylindrical body is formed by a nonwoven layer, and the air-cut layer which forms an internal layer is formed of a heat-fusible resin film which is heat-fusible with the nonwoven fabric tape.

3. A flexible hose as claimed in claim 2, wherein the reinforcing coil member, the nonwoven fabric tape and the resin film are formed of resin materials which are mainly consists of polypropylene.

4. A flexible hose as claimed in claim 2, wherein the cylindrical body is formed by spirally winding a composite tape which is made by adhering and layering the nonwoven tape and the resin film.

5. A flexible hose comprising:

a cylindrical body which is composed of a nonwoven fabric layer and an air-cut layer, the nonwoven fabric layer being formed by winding a nonwoven tape spirally, the air-cut layer being layered on at least one side of the nonwoven fabric layer;

a main resin reinforcing coil member which is attached to the cylindrical body; and a subsidiary resin reinforcing coil member which is attached to the cylindrical body, the subsidiary resin reinforcing coil member being positioned between the main resin reinforcing coil member;

wherein the nonwoven fabric tape, the main reinforcing coil member and the subsidiary resin reinforcing coil member are formed of heat-fusible resin materials a adjacent side end portions of the nonwoven tape are connected to the reinforcing coil member and are fused thereto by heat to form one body without the adjacent side end portions overlapping.

6. A flexible hose comprising:

a cylindrical body which is composed of a nonwoven fabric layer and an air-cut layer, the nonwoven fabric layer being formed by winding a nonwoven tape spirally so that side end portions of the nonwoven tape are adjacent one another at a connecting portion, the air-cut layer being layered on at least one side of the nonwoven fabric layer; and a resin reinforcing coil member which is attached to the cylindrical body;

wherein the nonwoven fabric tape and the reinforcing coil member are formed of heat-fusible resin materials and the adjacent side end portions of the nonwoven tape are each connected to the reinforcing coil member at the connecting portion and are fused thereto by heat.

* * * * *